March 10, 1953 J. G. WOODWARD 2,631,202
DYNASTAT VOLUME CONTROL
Filed Dec. 30, 1947 4 Sheets-Sheet 1
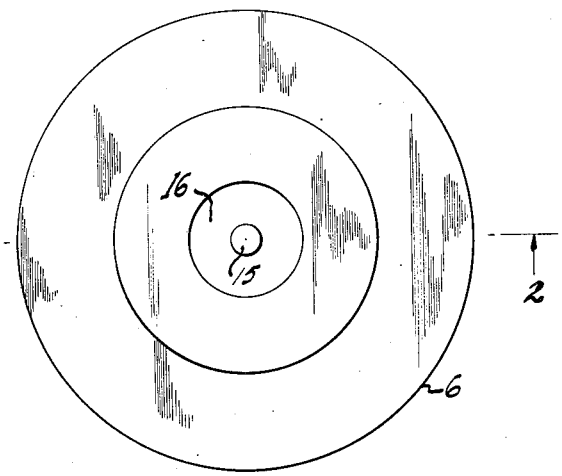
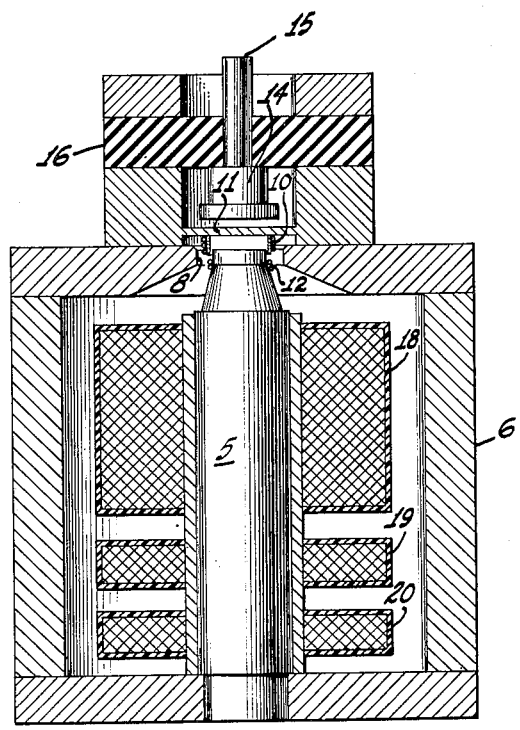
INVENTOR.
J. Guy Woodward
BY
ATTORNEY

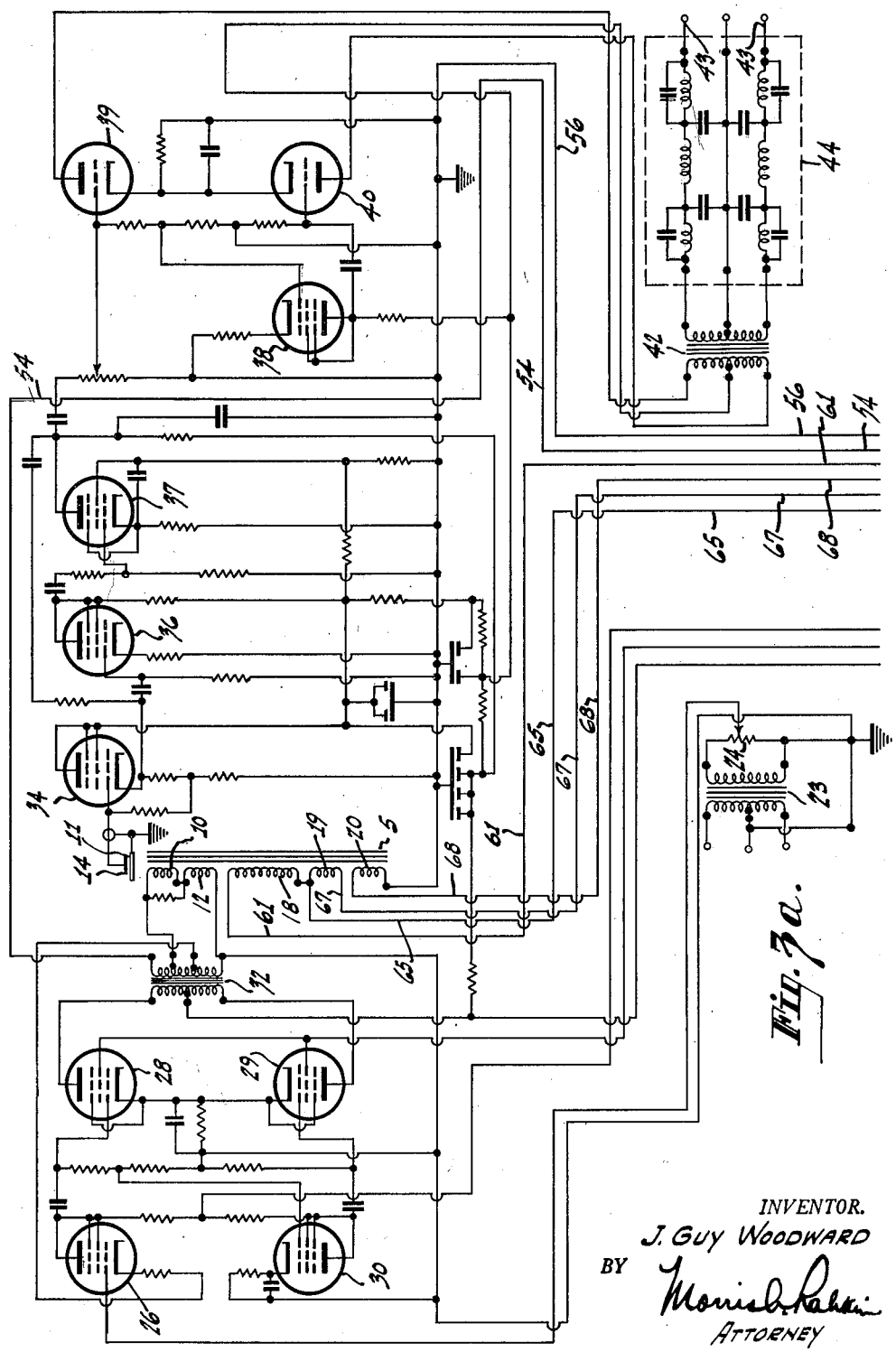

March 10, 1953 J G. WOODWARD 2,631,202
DYNASTAT VOLUME CONTROL
Filed Dec. 30, 1947 4 Sheets-Sheet 3

INVENTOR.
J. GUY WOODWARD
BY
ATTORNEY.

March 10, 1953  J. G. WOODWARD  2,631,202
DYNASTAT VOLUME CONTROL
Filed Dec. 30, 1947  4 Sheets-Sheet 4

INVENTOR.
J. Guy Woodward
BY
ATTORNEY.

Patented Mar. 10, 1953

2,631,202

UNITED STATES PATENT OFFICE 2,631,202

DYNASTAT VOLUME CONTROL

J. Guy Woodward, Princeton, N. J., assignor to Radio Corporation of America, a corporation of Delaware Application December 30, 1947, Serial No. 794,478

11 Claims. (Cl. 179—171)

1

This invention relates to electrical current transmission systems, and particularly to an improvement in an automatic volume regulating system such as disclosed and claimed in Morgan copending application, Ser. No. 791,071, filed December 11, 1947, now Patent No. 2,592,313.

In the above mentioned copending application, a compressor or limiter system utilizing a dynastat to obtain a variation in the volume level of a signal in accordance with the original level is disclosed. Instead of varying the bias voltage on a pair of push-pull variable gain tubes as was done in conventional compression amplifiers such as disclosed and claimed in Singer U. S. Patent No. 2,255,683 of September 9, 1941, and in Miller U. S. Patent No. 2,312,260 of February 23, 1943, a dynastat is used as the compressor unit. The dynastat is a combined magnetic and electrostatic mechanical transducer comprising a dynamic driving system and an electrostatic pickup, and is similar, in many respects, to a dynamic loud speaker having a voice coil centered in the magnetic field and rigidly attached to a diaphragm. Motion of the diaphragm is converted into voltage variations by a capacity pickup electrode, the alternating voltage generated at the electrode being directly proportional to the amplitude of vibration of the diaphragm. By varying the field coil strength in accordance with the signal level, the alternating current generated at the pickup electrode varies with the signal level.

By the use of such a transducer to obtain compression or expansion depending upon the polarity of the rectifier connections, the elimination of low frequency surges or "thumps" is obtained. Also, the necessity of carefully selecting and aging tubes and the precise adjustment of each section of the push-pull variable gain amplifier is avoided.

The present invention provides several improvements over the system disclosed and claimed in the above mentioned Morgan copending application, the first being the actuation of the control amplifier with a signal derived at a point in the system prior to the dynastat instead of after the dynastat or from the output of the variable gain amplifier, as is done in conventional compression amplifiers. The advantage of this connection is a reduced tendency for over-compression, a reduced tendency for motorboating, and the ease with which a time delay can be incorporated in the signal channel to reduce the effective attack time.

Another feature is the inclusion of a low-pass filter having a 15 kilocycle cut-off in the output to take out any high frequency transients such as 19 kilocycles which arise as a result of the dynastat diaphragm resonance when the amplitude of the diaphragm motion is changed abruptly. A third feature is the inclusion of additional coils in the dynastat to control the attack time of the system.

The principal object of the invention, therefore, is to facilitate and improve the compression of a transmitted signal.

Another object of the invention is to provide an improved compression, expansion, or limiting system inherently free of distortion caused by low frequency surges.

A further object of the invention is to provide an improved method of and system for obtaining a control signal.

A still further object of the invention is to provide an improved method of and system for controlling the attack time in a compression or expansion signal transmission system.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Fig. 1 is a plan view of the dynastat unit.

Fig. 2 is a cross-sectional view of the dynastat unit taken along the line 2—2 of Fig. 1.

Figs. 3a and 3b are schematic circuit diagrams of a complete system embodying the invention.

Figure 3B:
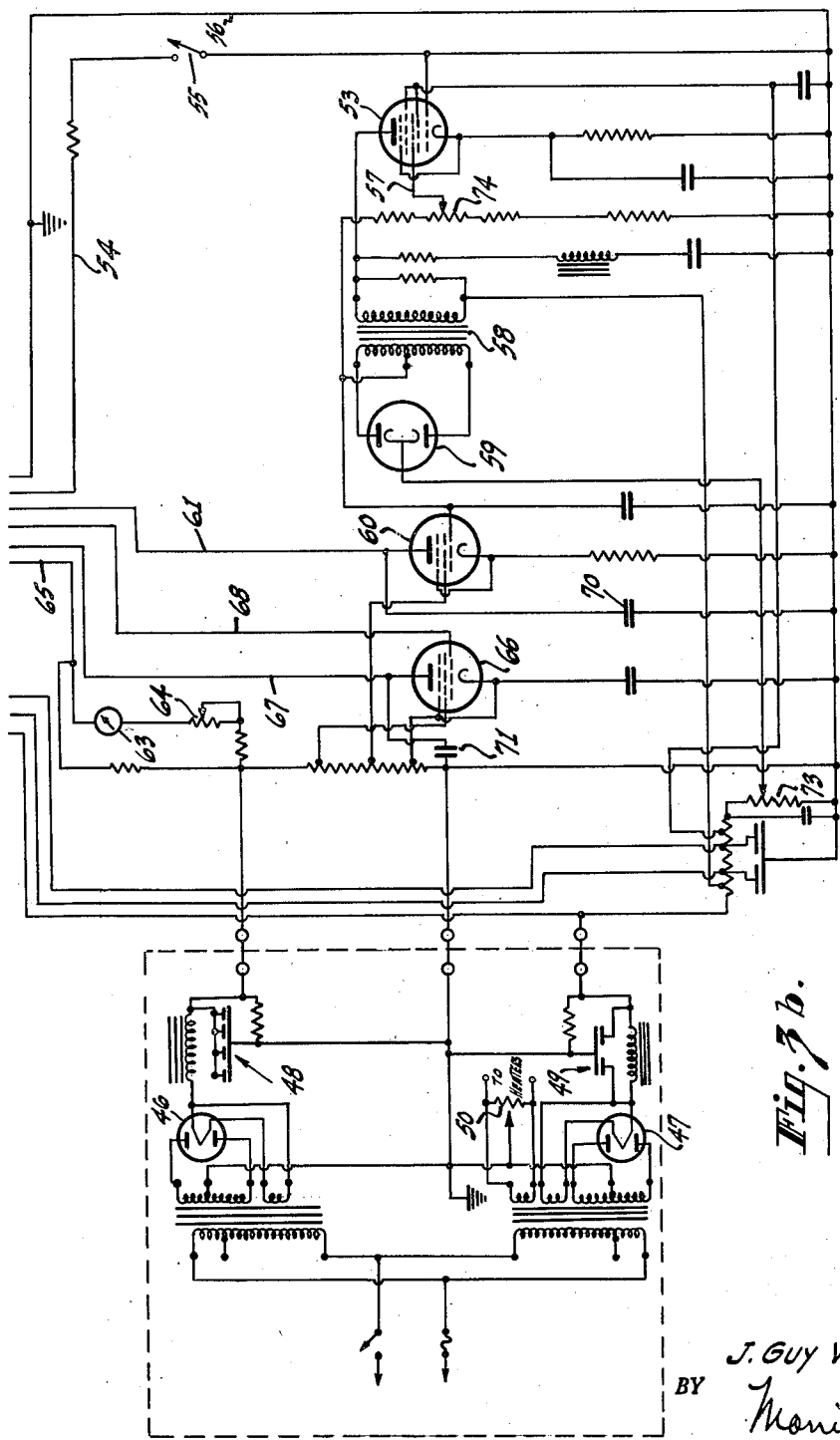

Referring now to the dynastat construction shown in Figs. 1 and 2, the unit consists of a magnetic core 5, which, together with a shell 6, forms a magnetic circuit having an air gap 8. In the magnetic field formed in the air gap 8, is a signal coil 10 rigidly attached to a diaphragm 11, while immediately under the coil 10 is a second coil 12 known as a "bucking" coil. Positioned immediately above the diaphragm 11 is an electrostatic pickup electrode 14 having a terminal 15 passing through insulation 16. Surrounding the core 5, are three coils 18, 19, and 20, coil 18 being the field coil disclosed and claimed in the above mentioned Morgan copending application, while coil 19 is a hustler coil, and coil 20 is a grid coil, the purpose and operation thereof to be described hereinafter.

The above described dynastat is the same type of unit disclosed in the above mentioned copending application, but which contains, in addition, the hustler and grid coils 19 and 20, respectively. That is, when a direct current is supplied to the field coil, and a signal current is supplied to the coil 10, the diaphragm 11 will vibrate in proportion to the amplitude of the signal current. The diaphragm has been made sufficiently stiff to have a natural frequency near 19 kilocycles, and thus, no resonance occurs within the audio range. Motion of the diaphragm 11 is converted into voltage variations by the capacity pickup electrode 14, which is maintained at a potential of approximately 115 volts positive with respect to the diaphragm. Thus, the alternating current generated in the electrode 15 is directly proportional to the amplitude of vibration of the diaphragm. The flux in the air gap 8 is generated by direct current flowing in the coil 18, and thus, the sensitivity of the dynastat is controlled by varying this field current. Since the diaphragm drive is magnetic, and the pickup from the diaphragm is electrostatic, the output voltage is inherently free of direct disturbances due to sudden changes in the magnetic field current. There is, however, a second order deleterious effect caused by the change in magnetic flux inducing a voltage in the coil 10 resulting in a current in this coil which will produce a motion of the diaphragm. As described in the above mentioned copending application, this difficulty is eliminated by the use of the bucking coil 12, which is connected in series with the coil 10 and with opposed polarity, the resulting voltage producing a zero change in the magnetic flux, and thus, no disturbance in the output voltage.

Referring now to the circuit shown in Figs. 3a and 3b, the input is over a transformer 23 having a potentiometer 24 across the secondary thereof, the potentiometer feeding a single amplifier tube 26 and a pair of push-pull tubes 28 and 29 after phase inversion in tube 30 to provide a connection between the unbalanced input and the balanced push-pull stage 28—29. The output of push-pull stage 28—29 is impressed across the primary of a transformer 32, the secondary of which is connected in series with the diaphragm driving coil 10 and the bucking coil 12 of the dynastat. The electrode 14 of the dynastat is connected to tube 34 which is connected as a cathode-follower, this type of circuit being disclosed and claimed in Morgan copending application, Ser. No. 741,080, filed April 12, 1947. The remaining portion of the circuit consists of single stage amplifiers 36 and 37, phase inverter 38, and a push-pull stage 39—40, the output of which is transmitted over a transformer 42 to the output terminals 43 through a 15 kilocycle low-pass filter shown within the broken lines 44. The tubes 34 to 40, inclusive, are resistance-capacity coupled in the conventional manner well-known in the art. Power for the circuit is obtained from a pair of rectifiers 46 and 47 with filters 48 and 49, respectively, a hum control being provided by potentiometer 50.

Referring now to the control amplifier of the invention, it will be noted that the input to alternating current control amplifier 53 is over conductor 54 which is connected to one terminal of the secondary of transformer 32 feeding the dynastat coils 10 and 12. The other conductor 56 is grounded. Although the input to the control amplifier has been shown from the secondary of transformer 32, it could be connected to the signal channel at any point prior to the dynastat where sufficient gain is available to operate the control. A switch 55 has been provided for disconnecting the control amplifier input from the output of push-pull stage 28—29 in case no compression is desired. As mentioned above, by obtaining the control voltage from the point in the system prior to the dynastat instead of a point subsequent thereto, there is a reduced tendency for over-compression, motorboating is minimized, and time delay can be easily incorporated in the signal channel to reduce the effective attack time.

Figure 4:
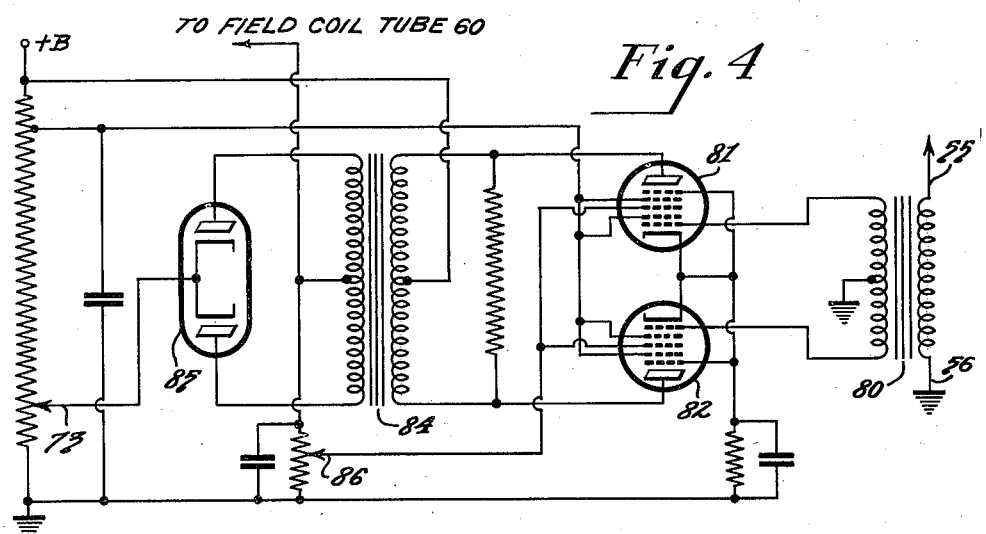
Fig. 4 is a schematic diagram of a modification of the control signal amplifier.

Continuing the control circuit, the output of amplifier 53 is transmitted over a transformer 58 to a full-wave rectifier 59, and then to a direct current amplifier 60. The tube 53 is, preferably, a 6L7 type of tube. To obtain the desired compression characteristics; that is, a control circuit which simulates the gain characteristic of the dynastat, and thus, may be connected to a point in the signal channel prior to the dynastat, a portion of the direct current bias must be fed back through a slope control 74 to the control grid of tube 53 over conductor 57. This application of direct current voltage to the control grid provides a change in the plate current of tube 53 and a slight thump voltage may be developed in the control circuit causing momentary overcompression in the over-all system. To completely avoid the thump voltage, and consequently, any over-compression, a push-pull arrangement of tubes such as 6L7's, as shown in Fig. 4, may be used. In the circuit of Fig. 4, a transformer 80 transmits the signal voltage to tubes 81 and 82, the output of which is transmitted over transformer 84 to a full-wave rectifier 85. The feedback voltage and slope control are obtained from a potentiometer 86.

The output of direct current amplifier 60 is connected over conductor 61 to field coil 18, this circuit including a milliammeter 63 in return conductor 65, for indicating the db gain reduction. A potentiometer 64 permits zero adjustment of the meter 63. To control the attack time, the attack time being made approximately 4 milliseconds, while the recovery time is approximately 0.22 second, the hustler and grid coils 19 and 20, respectively, are connected to tube 66. That is, the plate of tube 66 is connected over conductor 67 to one terminal of hustler coil 19, while the input to tube 66 is connected over conductor 68 to one terminal of the grid coil 20. Now, when the bias on direct current amplifier 60 is suddenly increased, the field current and consequently, the magnetic flux in the dynastat, decay exponentially at a rate dependent upon the resistance, capacitance, and inductance in the plate circuit of tube 60. Since it is desirable to have the flux decay as rapidly as possible, this decay may be accelerated by a pulse of current of appropriate sign and magnitude passing through hustler coil 19 upon the initiation of the decay in field coil 18. This pulse is obtained from tube 66, which is normally biased below cut-off, but which receives a positive pulse at its control grid over conductor 68 due to the voltage induced across grid coil 20 when the field current decreases. Capacitors 70 and 71, connected between the plates of tubes 60 and 66, respectively, and ground, have various values giving critical damping of the currents in coils 18 and 19 to provide for the most rapid decay possible.

Figure 5:
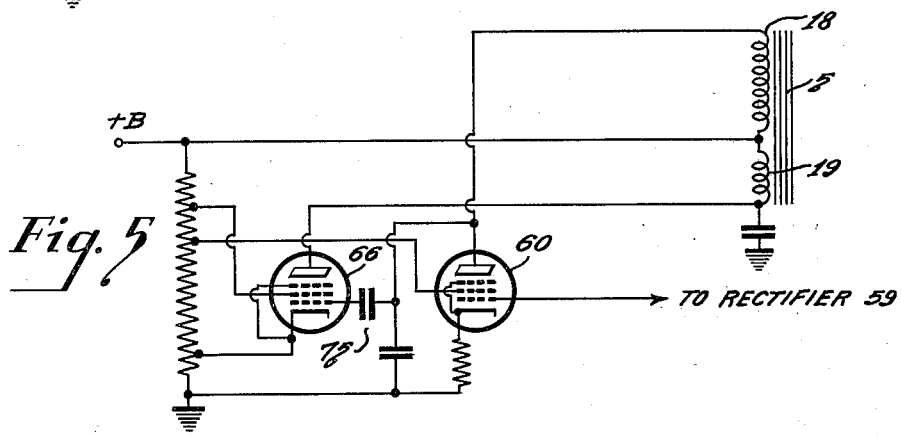
Figs. 5 and 6 are schematic diagrams of modifications of the hustler coil circuit.
Figure 6:
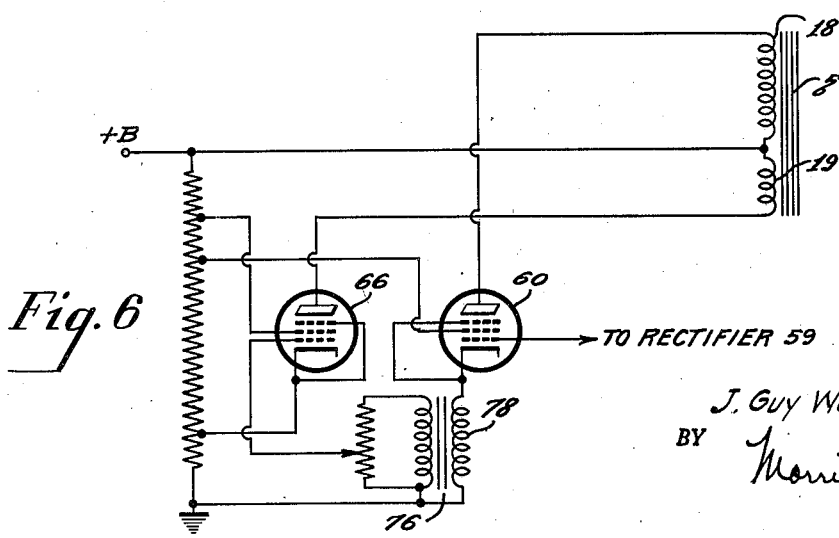

In Figs. 5 and 6, modifications of the hustler coil circuit of Fig. 3b are shown, these circuits differing from the one shown in Fig. 3b only in the manner in which the pulse is obtained for the grid of the hustler tube 66. For instance, in Fig. 5, the grid of tube 66 is connected through capacitor 75 to the plate side of the field coil 18, while in Fig. 6, the pulse is obtained through a transformer 76, the primary 78 of which is an inductor in the cathode circuit of the field-current tube 60. Changes in cathode current generate voltages across the primary 78 which are proportional to the time rate of change of the field current. In both of these circuit modifications, the grid coil 20 on the core 5 is eliminated.

The above circuits and dynastat construction have been found to have a minimum of distortion and noise, while various types and shapes of compression characteristics are obtainable. The break-away point or level at which compression begins is controlled by a potentiometer 73, as described in the above mentioned Singer patent, while the rate of compression or slope is controlled by potentiometer 74. The over-all frequency response is flat between 30 and 15,000 cycles within ±0.7 db without compression and within ±1.7 db with compression ratio of 20 db into 10 db.

I claim:

1. A signal transmission system comprising an amplifier of said signal, a transducer having an electrical signal current to mechanical motion portion and a mechanical motion to electrical voltage generating portion, means for connecting the input of said first mentioned portion of said transducer to the output of said amplifier, a second amplifier, means for connecting the input of said second amplifier to said second mentioned portion of said transducer, means for deriving a direct current proportional to the variations in amplitude of said signal current from said first amplifier, means for impressing said direct current on said transducer to vary its sensitivity, and means for controlling the rate of change of the sensitivity of said transducer.

2. A signal transmission system comprising an amplifier of said signal, a transducer having an electrical signal current to mechanical motion portion and a mechanical motion to electrical voltage generating portion, means for connecting the input of said first mentioned portion of said transducer to the output of said amplifier, a second amplifier, means for connecting the input of said second amplifier to said second mentioned portion of said transducer, means for deriving a direct current proportional to the variations in amplitude of said signal current from said first amplifier, means for impressing said direct current on said transducer to vary its sensitivity, and a direct current amplifier having its input connected to the output of said first mentioned signal amplifier, said transducer including a magnetic core, a field coil on which said direct current is impressed, a signal current coil, and a diaphragm attached to said signal current coil, and said second mentioned portion includes said diaphragm and an electrostatic electrode positioned adjacent said diaphragm, said transducer also including a plurality of coils on said core inductively coupled to said field coil, one of said coils controlling the flow of current through another of said coils to accelerate the decay of the field produced by said field coil.

3. An electrical compressor system for audio signals comprising an amplifier for said signals, a transducer connected to the output of said amplifier, said transducer translating electrical energy into mechanical motion and said mechanical motion into electrical energy, means for deriving a direct current having a predetermined relationship to the average amplitude of said signals at the output of said amplifier, means for varying the translation of said signals into mechanical motion in accordance with the amplitude of said signals and the magnitude of said derived direct current, and means for utilizing said derived direct current for controlling the rate of varying the translation of said signals into mechanical motion.

4. An electrical compressor system in accordance with claim 3, in which said means for deriving a direct current includes a control amplifier and a rectifier, said control amplifier having its input connected at a point in said system prior to said transducer, said means for varying the translation of said electrical energy into mechanical motion including a magnetic field producing coil on said transducer, and said last mentioned means including a direct current amplifier connected to said rectifier and a coil adjacent said field coil connected to said direct current amplifier for controlling the variations of the field produced by said field producing coil.

5. An electrical compressor system for audio signals comprising an amplifier of said signals, a transducer having a pair of serially connected coils connected to the output of said amplifier, a field coil and a pair of timing coils, said transducer translating said signals into mechanical motion and said mechanical motion into electrical energy, an amplifier for said translated electrical energy, a control amplifier having its input connected to said first mentioned amplifier, a rectifier having its input connected to said control amplifier, a direct current amplifier connected to the output of said rectifier, means for connecting the output of said direct current amplifier to said field coil, a timing control amplifier, means for connecting the output of said timing control amplifier to one of said timing coils, and means for connecting the input of said timing control amplifier to said second timing coil.

6. A signal compression system comprising a series of amplifiers for a signal to be transmitted, a transducer unit connected intermediate said amplifiers, said unit translating said signal into mechanical motion in one ratio, and said mechanical motion into electrical energy in a different ratio, a control amplifier having its input connected to said system at a point prior to said transducer unit, said control amplifier having a gain characteristic corresponding to that of said transducer unit, a rectifier connected to said control amplifier, means for connecting said rectifier to said transducer unit for controlling the ratio of energy translation therein, and means for controlling the rate of change of the ratio of energy translation.

7. A signal compression system in accordance with claim 6, in which said last mentioned means includes a direct current amplifier connected to said rectifier, a field coil in said transducer unit connected to the output of said direct current amplifier, the change in the field produced by said field coil varying the ratio of energy translation by said transducer, a timing control amplifier, a hustler coil in said transducer unit connected to the output of said timing control amplifier, said hustler coil increasing the rate of decay of the field produced by said field coil, and a grid coil in said transducer unit connected to the input of said timing control amplifier, said grid coil producing a pulse by the decay of the field produced by said field coil.

8. A signal compression system in accordance with claim 6, in which said last mentioned means includes a pair of serially connected direct current amplifiers connected to said rectifier, a field coil in said transducer unit connected to the output of one of said direct current amplifiers, the change in the field produced by said field coil varying the ratio of energy translation by said transducer, and a hustler coil connected to the output of said other direct current amplifier, said amplifiers being capacity coupled, the output current of said other direct current amplifier increasing the rate of decay of the field produced by said field coil.

9. A signal compression system in accordance with claim 6, in which said last mentioned means includes a pair of serially connected direct current amplifiers connected to said rectifier, a field coil in said transducer unit connected to the output of one of said direct current amplifiers, the change in the field produced by said field coil varying the ratio of energy translation by said transducer, and a hustler coil connected to the output of said other direct current amplifier, said amplifiers being transformer coupled, the output current of said other direct current amplifier increasing the rate of decay of the field produced by said field coil.

10. An electrical compressor system comprising a source of signals, a signal amplifier connected to said source, a rectifier connected to said amplifier, a direct current amplifier connected to said rectifier, a transducer for varying the ratio of translation of signal amplitudes of the signal from said signal amplifier, a field coil in said transducer connected to the output of said direct current amplifier, an increase in bias on said direct current amplifier decreasing the current in said field coil and the magnetic flux produced thereby and thus the ratio of energy translation by said transducer, a second amplifier, a second field coil connected to the output of said second amplifier, and a third field coil for energizing said second amplifier upon a change in flux produced by said first mentioned field coil to produce a current in said second mentioned field coil, to increase the rate of decay of the magnetic flux produced by said field coil when the current is decreased in said field coil.

11. An electrical compressor system in accordance with claim 10, in which said second amplifier is normally biased to cut-off.

J. GUY WOODWARD.

REFERENCES CITED

The following references are of record in the file of this patent:

UNITED STATES PATENTS

| Number | Name | Date |
|---|---|---|
| 1,565,441 | Hamilton | Dec. 15, 1925 |
| 1,828,284 | Hanna | Oct. 20, 1931 |
| 1,927,141 | Thomas | Sept. 19, 1933 |
| 1,967,125 | Miller | July 17, 1934 |
| 2,006,989 | Frantz | July 2, 1935 |
| 2,204,726 | Davis | June 18, 1940 |
| 2,205,227 | Smith | June 18, 1940 |
| 2,229,296 | La Mar | Jan. 21, 1941 |
| 2,252,002 | Halsey | Aug. 12, 1941 |
| 2,266,531 | Bedford | Dec. 16, 1941 |
| 2,270,983 | Weidenman | Jan. 28, 1942 |
| 2,353,162 | Kaltenbacher | July 11, 1944 |
| 2,416,557 | Wiener | Feb. 25, 1947 |